United States Patent
Ikeda

(10) Patent No.: US 10,331,065 B2
(45) Date of Patent: Jun. 25, 2019

(54) IMAGE PROCESSING DEVICE, IMAGE FORMING DEVICE, IMAGE FORMING SYSTEM, AND IMAGE PROCESSING PROGRAM

(71) Applicant: KONICA MINOLTA, INC., Chiyoda-ku, Tokyo (JP)

(72) Inventor: Makoto Ikeda, Hachioji (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/645,205

(22) Filed: Jul. 10, 2017

(65) Prior Publication Data
US 2018/0011437 A1 Jan. 11, 2018

(30) Foreign Application Priority Data
Jul. 11, 2016 (JP) .................................. 2016-136999

(51) Int. Cl.
 H04N 1/06 (2006.01)
 H04N 1/50 (2006.01)
 (Continued)

(52) U.S. Cl.
 CPC .......... *G03G 15/50* (2013.01); *G03G 15/5062* (2013.01); *H04N 1/06* (2013.01);
 (Continued)

(58) Field of Classification Search
None
See application file for complete search history.

(56) References Cited

U.S. PATENT DOCUMENTS 6,567,544 B1 * 5/2003 Kanno ................. G06T 5/009
 358/2.1
6,700,679 B1 * 3/2004 Fujita .................... H04N 1/502
 358/1.9
(Continued)

FOREIGN PATENT DOCUMENTS

CN 103040227 A 4/2013
JP 2005-153165 A 6/2005

OTHER PUBLICATIONS

The First Office Action dated Dec. 27, 2018, by the State Intellectual Property Office of People's Republic of china in corresponding Chinese Patent Application No. 201710565848.2 and English translation of the Office Action. (26 pages).

*Primary Examiner* — Anh-Vinh T Nguyen
(74) *Attorney, Agent, or Firm* — Buchanan Ingersoll & Rooney PC

(57) ABSTRACT

Provided is an image processing device used for image processing in an image forming device that executes linear image forming in a first direction repeatedly in a second direction orthogonal to the first direction and executes two-dimensional image forming on a recording medium, the image processing device including: a processor configured to: acquire a phase of a member that contributes to image forming by rotating or circulating in the second direction and calculate, for each of different phases, an input/output gradation characteristic indicating a correspondence relationship in density in the same pixels in pre-output image data and post-output image data acquired by scanning of an image formed on the recording medium; calculates correction data to solve a difference between the input/output gradation characteristic in each of the phases and a reference input/output gradation characteristic; and correct the pre-output image data with the correction data of each of the phases.

16 Claims, 12 Drawing Sheets

(51) Int. Cl.
   *H04N 1/60*   (2006.01)
   *G03G 15/00*  (2006.01)
(52) U.S. Cl.
   CPC ............ *H04N 1/504* (2013.01); *H04N 1/506* (2013.01); *H04N 1/6027* (2013.01); *H04N 2201/0082* (2013.01)

(56) References Cited

U.S. PATENT DOCUMENTS

| | | | |
|---|---|---|---|
| 6,934,057 B1* | 8/2005 | Namizuka | H04N 1/407 358/2.1 |
| 7,046,861 B2* | 5/2006 | Imaizumi | G06T 5/006 382/294 |
| 8,488,188 B2* | 7/2013 | Nomura | G03G 15/5062 358/1.18 |
| 9,857,746 B2* | 1/2018 | Okamura | G03G 15/5058 |
| 2003/0030824 A1* | 2/2003 | Ogasahara | B41J 2/2056 358/1.8 |
| 2004/0189729 A1* | 9/2004 | Nakahanada | B41J 29/393 347/14 |
| 2006/0268342 A1* | 11/2006 | Ishida | G03G 15/5037 358/3.01 |
| 2007/0177889 A1* | 8/2007 | Ueda | G03G 15/0131 399/38 |
| 2008/0123146 A1* | 5/2008 | Ike | H04N 1/4051 358/3.13 |
| 2009/0042125 A1* | 2/2009 | Goto | G03C 1/49845 430/271.1 |
| 2009/0317149 A1* | 12/2009 | Takura | G03G 15/0131 399/301 |
| 2010/0231631 A1* | 9/2010 | Hosaka | B41J 2/14274 347/15 |
| 2011/0103811 A1* | 5/2011 | Tamaki | G03G 15/04018 399/40 |
| 2011/0141528 A1* | 6/2011 | Hirano | B41J 2/04563 358/3.13 |
| 2011/0176152 A1* | 7/2011 | Ishii | H04N 1/6033 358/1.9 |
| 2011/0255106 A1* | 10/2011 | Takikawa | G03G 15/50 358/1.9 |
| 2013/0058662 A1* | 3/2013 | Nomura | G03G 15/55 399/15 |
| 2013/0077103 A1 | 3/2013 | Asako | |
| 2013/0101301 A1* | 4/2013 | Takikawa | G03G 15/5058 399/10 |
| 2014/0043391 A1* | 2/2014 | Satoh | B41J 2/12 347/19 |
| 2014/0268242 A1* | 9/2014 | Kaneko | G06K 15/1881 358/3.06 |
| 2015/0248093 A1 | 9/2015 | Ikeda | |
| 2016/0187805 A1* | 6/2016 | Hasegawa | G03G 15/043 347/118 |
| 2017/0102658 A1* | 4/2017 | Ikeda | G03G 15/5025 |
| 2017/0123341 A1* | 5/2017 | Matsuo | G03G 15/043 |
| 2017/0146924 A1* | 5/2017 | Horiuchi | G03G 15/043 |
| 2017/0280001 A1* | 9/2017 | Furuta | H04N 1/2346 |

* cited by examiner

IMAGE PROCESSING DEVICE, IMAGE FORMING DEVICE, IMAGE FORMING SYSTEM, AND IMAGE PROCESSING PROGRAM

The entire disclosure of Japanese Patent Application No. 2016-136999 filed on Jul. 11, 2016 including description, claims, drawings, and abstract are incorporated herein by reference in its entirety.

BACKGROUND OF THE INVENTION

Field of the Invention

The present invention relates to an image processing device, an image forming device, an image forming system, and an image processing program that can solve density unevenness in a specific direction, which unevenness may be generated in the image forming device, without using a special chart or an image region in specific density.

Description of the Related Art

As an image forming device, what performs two-dimensional image forming (on each page) by repeatedly performing exposure in one line or a plurality of lines in a first direction corresponding to image data (such as main scanning direction) with respect to an image carrier such as a photoreceptor drum driven in a second direction (such as sub scanning direction) orthogonal to the first direction is known.

For example, in an electrophotographic image forming device, scanning with a light beam modulated according to image data is performed in a main scanning direction on a surface of a charged photoreceptor drum. Along with this, the photoreceptor drum is driven in such a manner as to be rotated in a sub scanning direction. Then, a latent image formed on the photoreceptor drum is developed and converted into a toner image by a developing device. This toner image is transferred to paper.

In such an image forming device, there are members such as a photoreceptor drum, an intermediate transfer belt, and a developing sleeve which members contribute to image forming by rotating or circulating in the sub scanning direction. It is known that periodic density unevenness corresponding to a period of rotation or circulation is generated due to an influence of these members. In this density unevenness, an increase/decrease of density is often generated in response to one period of the rotation or circulation.

Note that as a method to solve such density unevenness in a main scanning direction of an image forming device, there are various kinds of methods such as a method described in JP 2005-153165 A.

A method of using a test chart to solve such density unevenness in the main scanning direction in image forming is executed in the following manner.

A technology to detect a phase of a causative rotary part and to perform density correction according to the phase in order to correct the above periodic unevenness is known. For example, as a phase detecting unit, there is a unit in which a sensor to give notification of a reference position (home position sensor (hereinafter, referred to as HP sensor)) is provided somewhere in one cycle and timing of a rotation for one cycle is kept detected.

In this technology, a pattern with uniform gradation in a sub scanning direction (test chart for density unevenness measurement) is first formed. Then, measurement with a scanner is performed and currently-generated periodic unevenness is detected. From the result, a correction value is created and applied to a print thereafter. Note that as a method of measuring a pattern with uniform gradation in a sub scanning direction, there are a method of performing measurement with a density sensor on an intermediate transfer belt and a method of performing measurement with an output onto paper.

However, it is necessary to measure an image-formed test chart in a measurement mode in order to create correction data of this case. That is, toner (or toner and paper) is consumed. Also, during measurement time (time for image forming of test chart or time for scanning of image-formed test chart), it is necessary to stop a normal operation in a device and downtime becomes a problem.

Also, in a case where a schedule of normal image forming is tight, it is not possible to make time for outputting a test chart. Thus, there is also a problem that it is not possible to perform correction of density unevenness.

On the other hand, in JP 2005-153165 A, it is proposed to execute detection and correction of density unevenness, which are similar to those using the test chart, by using a region with constant density which region is included in a graphic image in a formed image.

However, this technology is proposed on the assumption that there is a region in a uniform color in document image data. A graphic image such as a graph is assumed. However, there is a case where actually-output document image data has no region in a uniform color, for example, in a case of an image such as a picture. In this case, it is not possible to detect density unevenness depending on document image data.

SUMMARY OF THE INVENTION

The present invention has been made in view of the forgoing, and an object thereof is to realize an image processing device, an image forming device, an image forming system, and an image processing program that can detect and correct density unevenness, which is generated in image forming, without a need for a constant density region in an image and without interrupting a normal operation of the image forming device by printing of a special test chart.

In order to solve the above-described problems, an image processing device, an image forming device, an image forming system, and an image processing program reflecting an aspect of the present invention are configured in the following manner.

(1) To achieve the abovementioned object, according to an aspect, there is provided an image processing device used for image processing in an image forming device that executes linear image forming in a first direction repeatedly in a second direction orthogonal to the first direction and executes two-dimensional image forming on a recording medium, and the image processing device reflecting one aspect of the present invention comprises: a processor configured to: acquire a phase of a member that contributes to image forming by rotating or circulating in the second direction and calculate, for each of a plurality of different phases, an input/output gradation characteristic indicating a correspondence relationship in density in the same pixels in pre-output image data used for the image forming in the image forming device and post-output image data acquired by scanning of an image formed on the recording medium by the image forming device; calculates, for each of the phases, correction data to solve a difference between the input/ output gradation characteristic in each of the phases and a reference input/output gradation characteristic; and correct the pre-output image data with the correction data of each of the phases.

To achieve the abovementioned object, according to an aspect, there is provided an image forming device that executes linear image forming in a first direction repeatedly in a second direction orthogonal to the first direction and executes two-dimensional image forming on a recording medium, and the device reflecting one aspect of the present invention comprises: the image processing device described above; an image forming unit that performs image forming on the basis of pre-output image data image processing of which is performed by the image processing device; an image reading unit that reads an image, image forming of which is performed by the image forming unit, and generates post-output image data; and a phase acquiring unit that acquires a phase of a member that contributes to image forming by rotating or circulating in the second direction in the image forming unit.

To achieve the abovementioned object, according to an aspect, there is provided an image forming system that executes linear image forming in a first direction repeatedly in a second direction orthogonal to the first direction and executes two-dimensional image forming on a recording medium, and the system reflecting one aspect of the present invention comprises: the image processing device described above; an image forming device that performs image forming on the basis of pre-output image data image processing of which is performed by the image processing device; an image reading device that reads an image, image forming of which is performed by the image forming device, and generates post-output image data; and a phase acquiring unit that acquires a phase of a member that contributes to image forming by rotating or circulating in the second direction in the image forming device.

To achieve the abovementioned object, according to an aspect, there is provided a non-transitory recording medium storing a computer readable program for controlling an image processing device used for image processing in an image forming device that executes linear image forming in a first direction repeatedly in a second direction orthogonal to the first direction and executes two-dimensional image forming on a recording medium, and the program reflecting one aspect of the present invention causes a computer to: acquire a phase of a member that contributes to image forming by rotating or circulating in the second direction and calculate, for each of a plurality of different phases, an input/output gradation characteristic indicating a correspondence relationship in density in the same pixels in pre-output image data used for image forming in the image forming device and post-output image data acquired by scanning of an image formed on the recording medium by the image forming device; calculate, for each of the phases, correction data to solve a difference between the input/output gradation characteristic in each of the phases and a reference input/output gradation characteristic; and correct the pre-output image data with the correction data of each of the phases.

(2) According to the image processing device of Item. 1, when calculating the input/output gradation characteristic, the processor preferably calculates the input/output gradation characteristic after accumulating and storing the pre-output image data and the post-output image data for each of the phases.

(3) According to the image processing device of Item. 2, when calculating the input/output gradation characteristic after accumulating and storing the pre-output image data and the post-output image data for each of the phases, the processor preferably changes a weighting factor according to time of the accumulation and storage and sets a large weighting factor for time close to a time point of the calculation.

(4) According to the image processing device of Item. 1, the processor preferably uses, as the reference input/output gradation characteristic, one of an input/output gradation characteristic, which is calculated by averaging of the input/output gradation characteristics in the plurality of different phases, and a previously-given input/output gradation characteristic.

(5) According to the image processing device of Item. 1, the processor preferably calculates the reference input/output gradation characteristic by averaging of the input/output gradation characteristics in the plurality of different phases in a case where a necessary amount of the pre-output image data and the post-output image data necessary for calculation of the input/output gradation characteristics is acquired, and uses a previously-given input/output gradation characteristic as the reference input/output gradation characteristic in a case where the necessary amount of the pre-output image data and the post-output image data is not acquired.

(6) According to the image processing device of Item. 1, in a case where the pre-output image data and the post-output image data are acquired only in a part of a region or a part of gradation, the processor preferably calculates the input/output gradation characteristic only in the part of the region or the part of the gradation, and calculates the correction data in the part of the region or the part of the gradation in which the input/output gradation characteristic exists.

(7) According to the image processing device of Item. 1, in a case where the image forming device forms a color image on the recording medium by using color materials in a plurality of colors, the processor preferably calculates the input/output gradation characteristic in a pixel in which only a color material in any one color is used.

(8) According to the image processing device of Item. 1, the processor preferably calculates a sine wave approximated with reference to a result of calculation in each of the phases and calculates the correction data by using the sine wave.

(9) According to the image processing device of Item. 1, the processor preferably acquires, with a focus on a plurality of different periods in different members with respect to a rotation or circulation in the member, an input/output gradation characteristic in a phase in each of the plurality of periods.

(10) According to the image processing device of Item. 9, when acquiring the input/output gradation characteristic in the phase of each of the plurality of periods, the processor preferably first acquires an input/output gradation characteristic in a phase of a short period and subsequently acquires an input/output gradation characteristic in a phase of a long period.

(11) According to the image processing device of Item. 9, when acquiring the input/output gradation characteristic in the phase of each of the plurality of periods, in a case where a phase in which the input/output gradation characteristic is to be acquired is a focused phase and a phase other than the focused phase is a not-focused phase, the processor preferably reduces an influence of the not-focused phase on the focused phase by performing weighting in the focused phase in such a manner that a frequency of a component of the not-focused phase is equalized, and acquires the input/output gradation characteristic in the focused phase.

(12) According to the image processing device of Item. 1, calculation of an input/output gradation characteristic in the second direction, calculation of correction data in the second direction, and correction of the image data with the correction data which are preferably executed by the processor are executed at each of a plurality of positions in the first direction.

(13) According to the image processing device of Item. 1, the processor preferably calculates the input/output gradation characteristic from the pre-output image data corrected with the correction data by the image processing unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
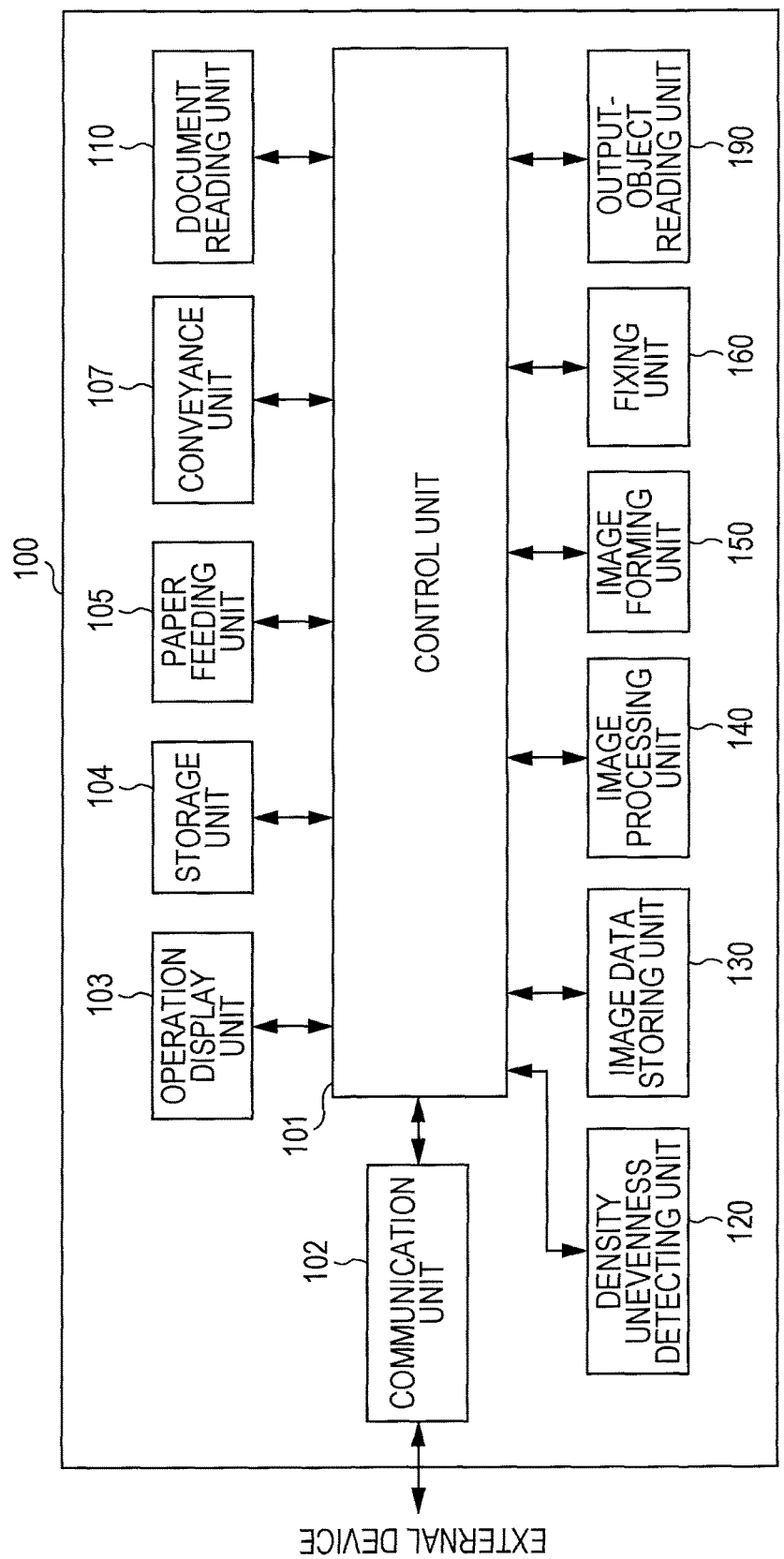
FIG. 1 is a block diagram illustrating a configuration of an image forming device of an embodiment of the present invention.

Hereinafter, a mode to carry out the present invention (hereinafter, referred to as embodiment) will be described in detail with reference to the drawings. However, the scope of the invention is not limited to the illustrated examples. Here, the embodiment will be described in detail with a focus on an image forming device 100 including an image processing device.

[Whole Configuration]

First, with reference to FIGS. 1 and 2, a configuration of an image forming system or an image forming device 100 according to the present embodiment will be described.

The image forming device 100 includes a control unit 101, a communication unit 102, an operation display unit 103, a storage unit 104, a paper feeding unit 105, a conveyance unit 107, a document reading unit 110, a density unevenness detecting unit 120, an image data storing unit 130, an image processing unit 140, an image forming unit 150, a fixing unit 160, and an output-object reading unit 190.

Note that this image forming device 100 executes linear image forming in a first direction (main scanning direction) repeatedly in a second direction (sub scanning direction) orthogonal to the first direction and executes two-dimensional image forming on a recording medium.

Here, the control unit 101 controls each part in the image forming device 100 and controls a whole image forming system. The communication unit 102 communicates with a different connected device. The operation display unit 103 notifies the control unit 101 of an operation input signal corresponding to operation input by an operator and displays a state of the image forming device 100 or gives notification or warning. The storage unit 104 stores a control program and various kinds of setting data and is used as a work area of a control program. The paper feeding unit 105 feeds housed paper toward the image forming unit 150. The conveyance unit 107 conveys fed paper, on which image forming is performed, at a predetermined speed. The document reading unit 110 scans a document and generates image data. The density unevenness detecting unit 120 detects density unevenness generated in a sub scanning direction of an image formed on the paper and calculates correction data thereof. The image data storing unit 130 stores image data or various kinds of data in image forming. The image processing unit 140 executes various kinds of image processing necessary for image forming. The image forming unit 150 (see FIG. 2) executes printing by electrophotographic imaging, transfer, and fixing (hereinafter, referred to as "image forming") on the basis of an image forming instruction and image data of after image processing. The fixing unit 160 stabilizes an image, which is transferred onto paper, with heat and pressure. The output-object reading unit 190 reads an image on paper on which image forming is performed.

Note that in such an image forming device 100, there are members such as a photoreceptor drum, an intermediate transfer belt, and a developing sleeve in the image forming unit 150 which members contribute to image forming by rotating or circulating in the sub scanning direction. It is known that periodic density unevenness corresponding to a period of rotation or circulation is generated due to an influence of these members. Thus, with respect to a rotary part rotated in the sub scanning direction or a circulation part circulated in the sub scanning direction, specifically, with respect to a phase of a rotation or circulation of a member that contributes to image forming, an HP sensor to give notification of a reference position is provided and timing of a rotation for one cycle is kept detected.

Figure 3:
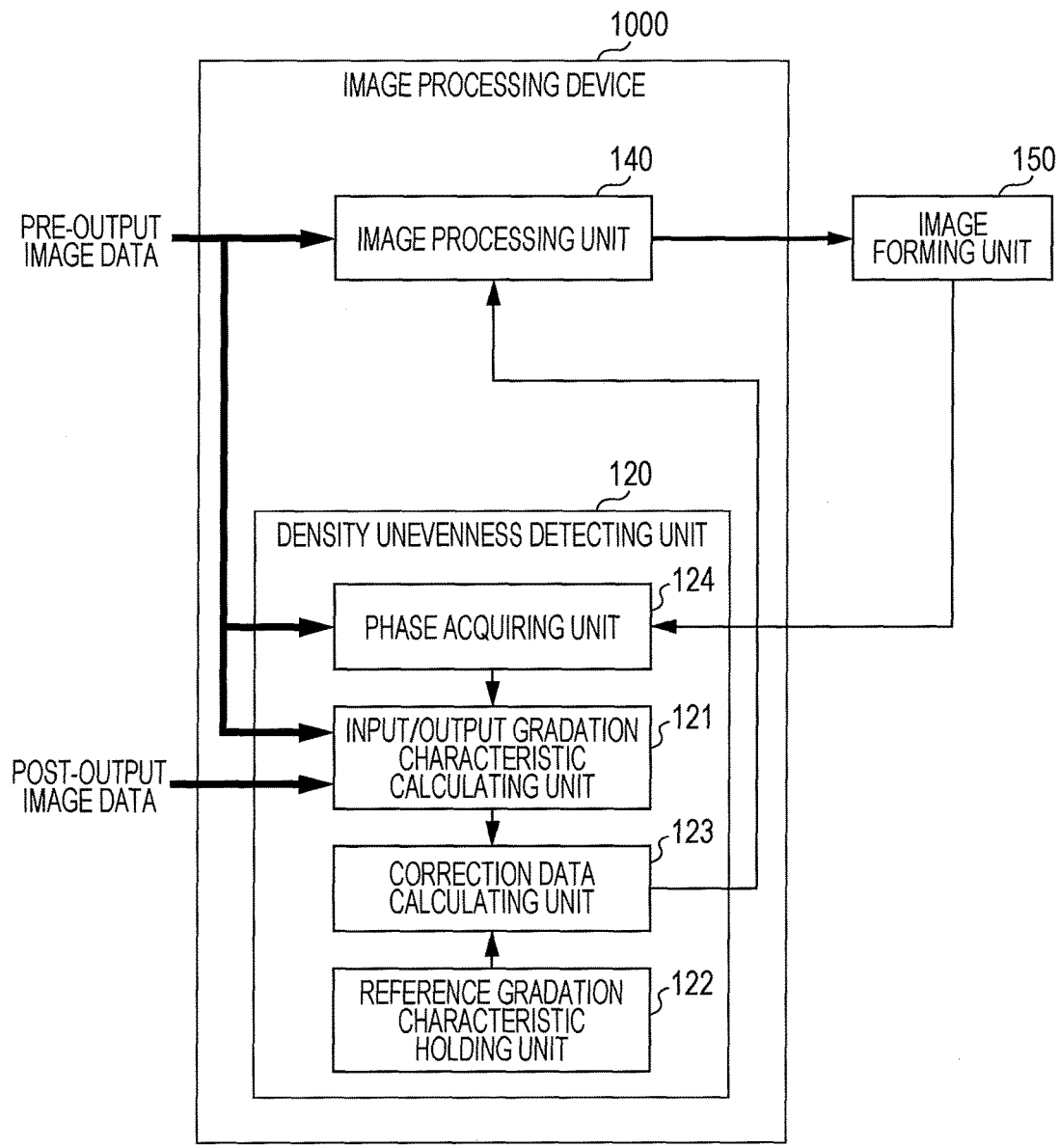
FIG. 3 is a configuration view illustrating a configuration of an image processing device of the embodiment of the present invention.

Also, as illustrated in FIG. 3, it is possible to configure an image processing device 1000 with the density unevenness detecting unit 120 and the image processing unit 140. This image processing device 1000 may be in the image forming device 100 or may exist as a separate image processing device 1000.

Here, an inner configuration of the image processing device 1000 is illustrated in FIG. 3. Here, the image processing device 1000 includes the density unevenness detecting unit 120 and the image processing unit 140.

Also, the density unevenness detecting unit 120 includes an input/output gradation characteristic calculating unit 121, a reference gradation characteristic holding unit 122, a correction data calculating unit 123, and a phase acquiring unit 124.

Note that in this embodiment, image data used for image forming will be referred to as "pre-output image data." Also, an image on paper on which image forming is performed (post-output image) is read by the document reading unit 110 or the output-object reading unit 190. Image data generated as a result of the reading will be referred to as "post-output image data."

Figure 4:
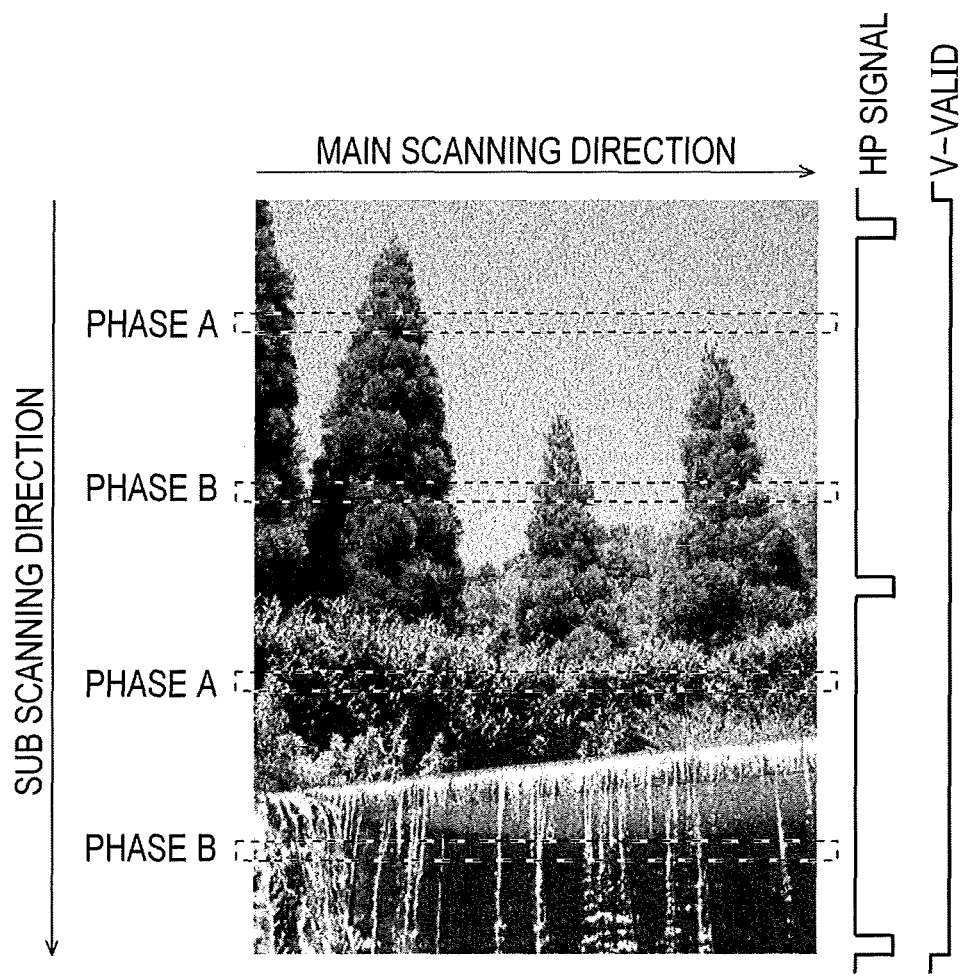
FIG. 4 is a view for describing, with a photographic image, a state of an image processed in the embodiment of the present invention.

FIG. 4 is a view illustrating an image which is to be formed from the pre-output image data and in which density unevenness in a sub scanning direction does not exist (pre-output image). Here, with respect to a phase in a sub scanning direction of a rotary member such as a photoreceptor drum which member contributes to image forming, an HP signal indicating a reference position is illustrated in contrast with an image. Also, a state in which a phase A and a phase B indicated by broken lines are determined in one period of this HP signal is schematically illustrated.

Figure 5:
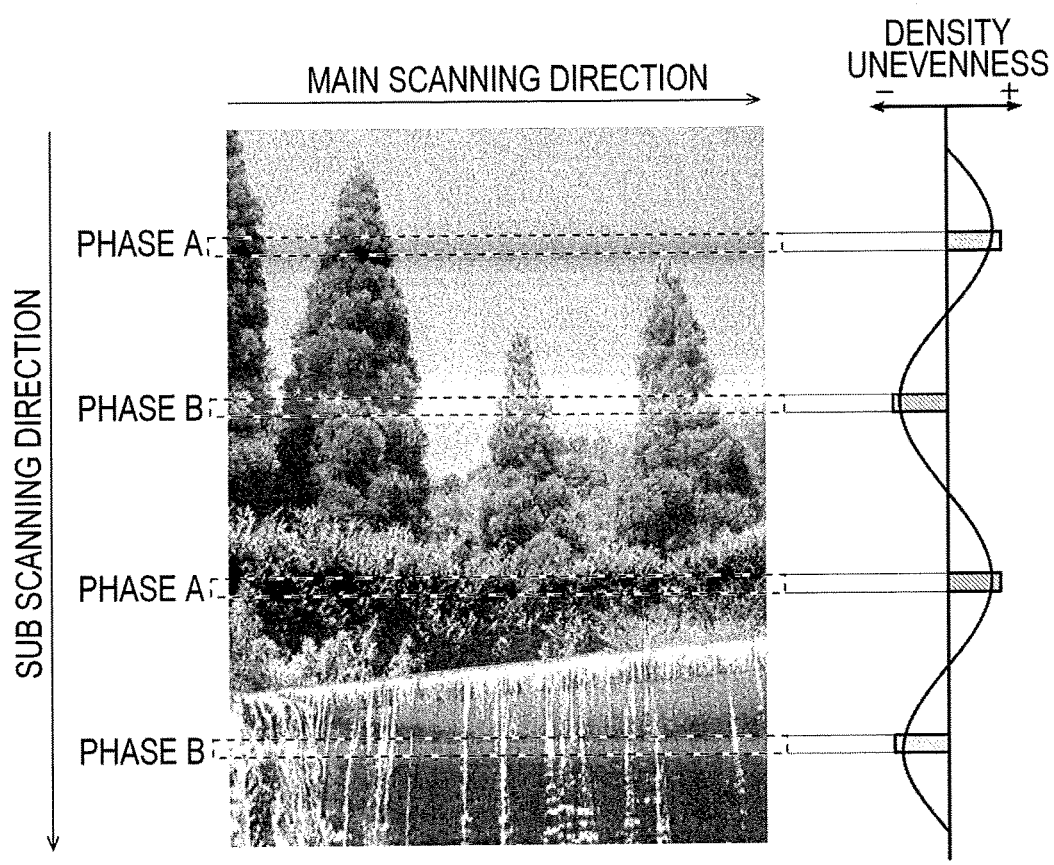
FIG. 5 is a view for describing, with a photographic image, a state of an image processed in the embodiment of the present invention.

FIG. 5 is a view illustrating an image (post-output image) image forming of which is performed from the pre-output image data and in which density unevenness in the sub scanning direction exists. Similarly to FIG. 4, a phase is determined in the sub scanning direction and is indicated by a broken line in FIG. 5.

Note that in one period of a rotary member, at least two phase positions are determined. The number of phase positions may be larger than this.

Also, phase positions in the sub scanning direction of the phase A and the phase B are different but are continuous in the main scanning direction. However, as described later, it is possible to divide this phase position in the main scanning direction and to perform correction of density unevenness.

Note that setting or setting change to determine a phase position in the above manner may be performed by various kinds of methods such as setting in a factory during production, and setting by a user through the operation display unit 103 of the image forming device 100. Also, as described later, it is possible to automatically set the number of regions from a result of calculation of an input/output gradation characteristic.

Here, the input/output gradation characteristic calculating unit 121 calculates, for each of a plurality of phases that are different in the second direction, an input/output gradation characteristic indicating a correspondence relationship in density in the corresponding same pixels in pre-output image data used for image forming and post-output image data acquired by scanning of an image-formed image.

Note that for this sake, the phase acquiring unit 124 grasps a relationship between a phase of a member that contributes to image forming by rotating or circulating in the sub scanning direction (hereinafter referred to as "rotary member") and that of an image by receiving V-VALID and an HP signal from the image forming unit 150.

That is, the input/output gradation characteristic calculating unit 121 generates input/output gradation characteristics in the phase A in FIG. 4 and in the phase A in FIG. 5 from density of pre-output image data and density of post-output image data in the same pixels. Similarly, the input/output gradation characteristic calculating unit 121 generates input/output gradation characteristics in the phase B in FIG. 4 and in the phase B in FIG. 5 from density of pre-output image data and density of post-output image data in the same pixels.

Note that in a case where the image forming unit 150 forms a color image on a recording medium by using color materials in a plurality of colors, the input/output gradation characteristic calculating unit 121 calculates an input/output gradation characteristic in a pixel in which only a color material in any one color is used. Accordingly, it becomes possible to accurately calculate density unevenness in a target color without an influence of a color material in a different color.

In a case where pre-output image data and post-output image data that are necessary for calculation of an input/output gradation characteristic are acquired adequately, the input/output gradation characteristic calculating unit 121 calculates a reference input/output gradation characteristic by averaging of input/output gradation characteristics in the plurality of different phases. This reference input/output gradation characteristic is held in the reference gradation characteristic holding unit 122.

Also, in a case where pre-output image data and post-output image data necessary for calculation of an input/output gradation characteristic are not acquired adequately, the input/output gradation characteristic calculating unit 121 makes the reference gradation characteristic holding unit 122 hold a previously-given input/output gradation characteristic as a reference input/output gradation characteristic. Note that here, the case where pre-output image data and post-output image data necessary for calculation of an input/output gradation characteristic are not acquired adequately means a state in which it is not possible to generate a characteristic curve from minimum density to maximum density by connecting data on a graph (performing linear interpolation).

The correction data calculating unit 123 calculates, for each of the plurality of different phases, correction data to solve a difference between an input/output gradation characteristic in each of the plurality of different phases and the reference input/output gradation characteristic and notifies the image processing unit 140 of the correction data. Note that this correction data will be described later in detail.

The image processing unit 140 performs image processing in such a manner as to correct pre-output image data with correction data of each of the plurality of different phases and to solve a difference in the input/output gradation characteristics in the plurality of phases different in the second direction. That is, the image processing unit 140 performs image processing on the basis of the correction data in such a manner that input/output gradation characteristics becomes identical in a plurality of phase regions. Then, density unevenness is solved as a result of such image processing.

Figure 2:
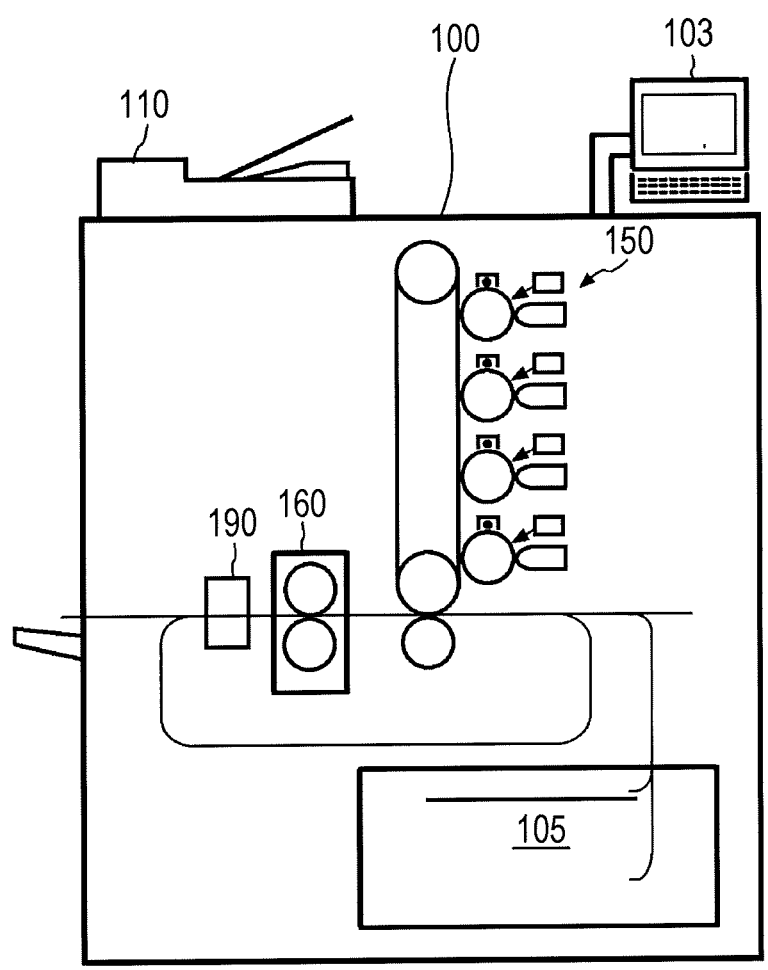
FIG. 2 is a configuration view illustrating a configuration of the image forming device of the embodiment of the present invention.

In FIGS. 1 and 2 described above, the image forming device 100 is illustrated. However, this is not the limitation. For example, an output-object reading unit 190 may be provided in a postprocessing device or a different device in an image forming system. Also, an image processing device 1000 and an image forming device 100 may be configured separately in an image forming system.

First Embodiment

In the following, operation of the present embodiment will be described with reference to a flowchart in FIG. 6, and characteristic views illustrating detailed examples of an input/output gradation characteristic in and after FIG. 7. Here, operation will be described on the assumption that the image forming device 100 includes the image processing device 1000.

Figure 6:
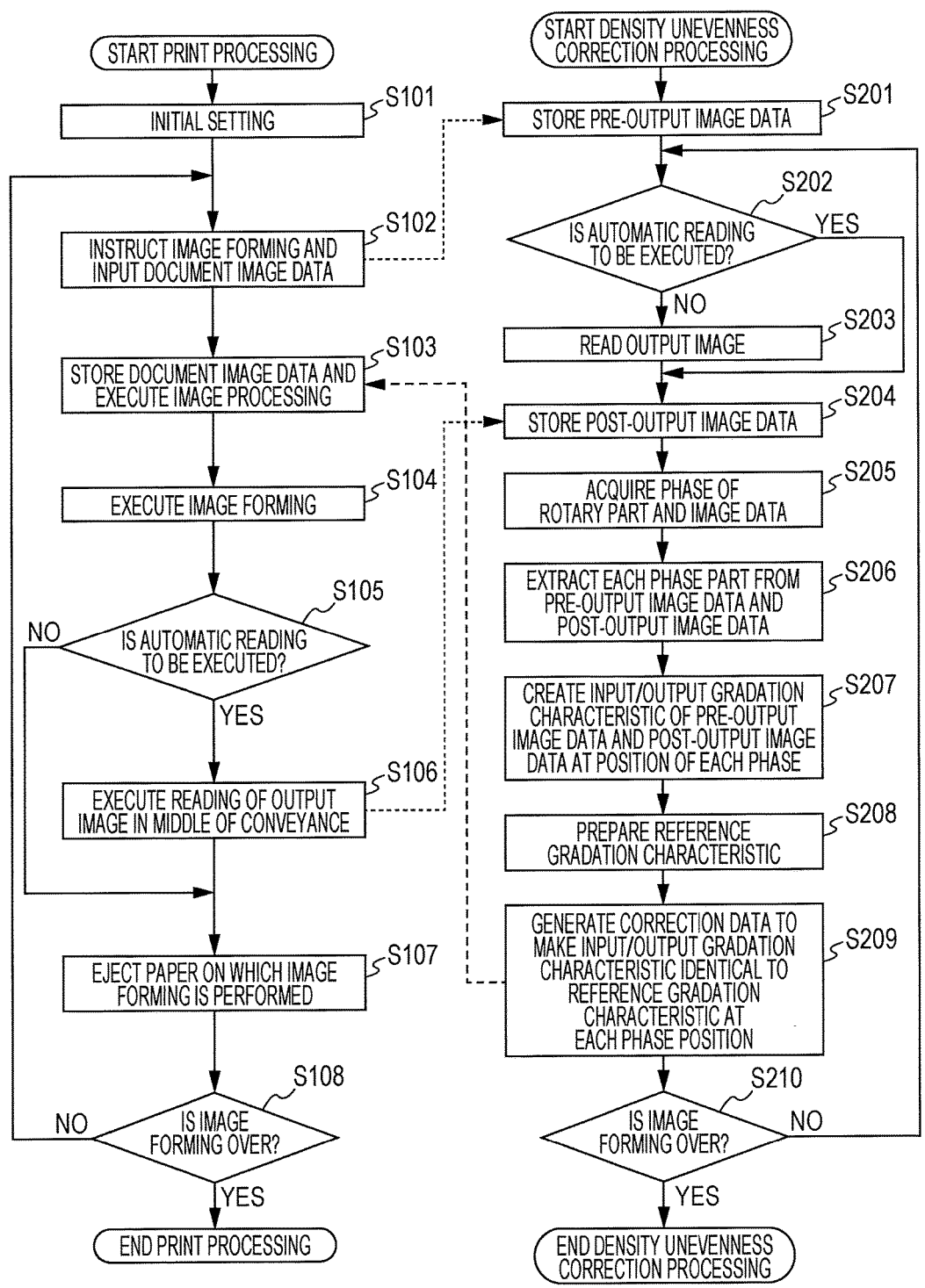
FIG. 6 is a flowchart illustrating operation of image forming of the embodiment of the present invention.

The control unit 101 performs initial setting of each part when operation of print processing is started in the image forming device 100 (step S101 in FIG. 6).

When an image forming instruction and document image data are given (step S102 in FIG. 6), the control unit 101 stores document image data into the image data storing unit 130 when necessary and executes image processing in the image processing unit 140 when necessary (step S103 in FIG. 6). Note that in this image processing, in a case where correction data described later (broken line input in step S103 in FIG. 6) is already generated, image processing with the correction data is also executed.

In such a manner, document image data on which image processing for image forming is performed is pre-output image data in the present embodiment. This pre-output image data is stored in the image data storing unit 130 and is also used for density unevenness correction processing (step S201 in FIG. 6).

The control unit 101 makes the image forming unit 150 execute image forming by using the image data on which the image processing by the image processing unit 140 is performed (pre-output image data) (step S104 in FIG. 6).

Here, in a case where the output-object reading unit 190 is in the image forming device 100 and is set to execute automatic reading (YES in step S105 in FIG. 6), the control unit 101 performs control in such a manner that the output-object reading unit 190 reads an image on paper on which image forming is performed by the image forming unit 150 (post-output image) (step S106 in FIG. 6). Note that the control unit 101 performs control in such a manner that image data acquired by the output-object reading unit 190 (post-output image data) is stored in the image data storing unit 130 in association with memory of the above-described pre-output image data (step S201 in FIG. 6) (step S204 in FIG. 6).

Also, even in an image forming system in which a reading device corresponding to the output-object reading unit 190 is arranged as a postprocessing device, a control unit 101 performs control in such a manner that image data acquired similarly by the reading device by reading of an image on paper (post-output image data) is stored into an image data storing unit 130 in association with the above-described pre-output image data (step S201 and step S204 in FIG. 6).

On the other hand, in a case where the output-object reading unit 190 is not in the image forming device 100 or is not set to execute automatic reading (NO in step S105 in FIG. 6 or NO in step S202 in FIG. 6), a user reads an image on paper, on which image forming is performed, by using the document reading unit 110 or a different reading device (not illustrated) (step S203 in FIG. 6). The control unit 101 performs control in such a manner that image data acquired by the reading (post-output image data) is stored into the image data storing unit 130 in association with the above-described pre-output image data (step S201 and S204 in FIG. 6). Here, periodic density unevenness to be corrected in the sub scanning direction is generated due to an electrophotographic process such as eccentricity of a rotary part, which becomes a cause of density unevenness. Thus, the generation is due to a common cause even in different jobs. Thus, image data accumulated to detect density unevenness may be collected from a plurality of kinds and a plurality of sheets of jobs. It is preferable that data is collected from a plurality of kinds and a plurality of sheets of jobs in order to increase the number of samples of data.

Then, the control unit 101 controls each part in the image forming device 100 in such a manner that paper on which image forming is already performed is ejected to a predetermined paper ejecting unit (step S107 in FIG. 6). As print processing by the image forming device 100, the control unit 101 controls each part in such a manner that a series of processing similar to the above is executed repeatedly until the processing is over with respect to whole instructed document image data (NO in step S108→step S102 in FIG. 6, or YES in step S108→end in FIG. 6).

On the other hand, as density unevenness correction processing, the phase acquiring unit 124 that receives an instruction from the control unit 101 receives V-VALID and an HP signal from the image forming unit 150 and acquires pre-output image data and a period and a phase of a rotary part in the pre-output image data (step S205 in FIG. 6). Here, each phase in the period of the rotary part with respect to density unevenness to be corrected, and image data are accumulated. Since timing at which a formed image is transferred onto paper and a phase of density unevenness to be corrected are not synchronized due to timing of image processing or an imaging process of the image-formed image, it is not possible to determine which sub scanning position in the image corresponds to which phase on the basis of the pre-output image data and the post-output image data. Thus, an HP signal and V-VALID are kept detected and an image sub scanning position and a phase of a rotary part are associated to each other at a time point of image processing. For example, with a certain position between HP signals as a phase A, image data at a position of the phase A between the HP signals is collected as data of the phase A.

Here, as the number of sampled positions of phases becomes large, detection accuracy of density unevenness is increased. On the other hand, as the number of sampled positions of phases becomes small, the detection accuracy is decreased. However, in order to detect certain periodic density unevenness, it is necessary to collect data at a sampling rate that is at least twice of a frequency of a target according to a sampling theorem. That is, when data can be collected at least in an interval of a half period in one period of a rotary part, it is possible to reconstruct a shape of generated periodic density unevenness. Thus, in detection of density unevenness, the density unevenness is detected at least after data of two phases in an interval of a half of a period of a rotary part is accumulated.

That is, one period of pre-output image data is divided into a plurality of phases in the sub scanning direction (see FIG. 4), one period of post-output image data is divided into a plurality of phases in the sub scanning direction (see FIG. 5), and the control unit 101 controls the input/output gradation characteristic calculating unit 121 in such a manner that data at a plurality of corresponding phase positions in the pre-output image data and the post-output image data is extracted (step S206 in FIG. 6).

Moreover, the control unit 101 controls the input/output gradation characteristic calculating unit 121 in such a manner that an input/output gradation characteristic indicating a correspondence relationship in density in the same pixels in the pre-output image data and the post-output image data is calculated for each of the plurality of regions divided in the sub scanning direction (step S207 in FIG. 6).

That is, the input/output gradation characteristic calculating unit 121 generates an input/output gradation characteristic Fio_A in a phase A from density of pre-output image data and density of post-output image data with respect to the same pixels in the phase A in FIG. 4 and the phase A in FIG. 5. Similarly, the input/output gradation characteristic calculating unit 121 generates an input/output gradation characteristic Fio_B in a phase B from density of pre-output image data and density of post-output image data with respect to the same pixels in the phase B in FIG. 4 and the phase B in FIG. 5. Note that a gradation part that does not exist is preferably interpolated by linear interpolation or the like.

Figure 7:
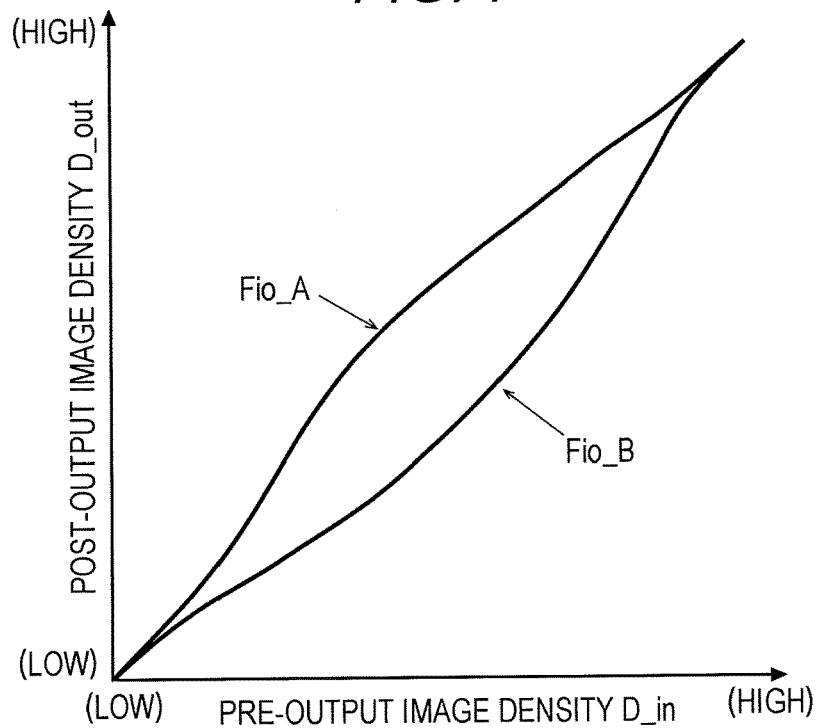
FIG. 7 is a characteristic view illustrating a characteristic of image processing in the embodiment of the present invention.

An example of these input/output gradation characteristics Fio_A and Fio_B is illustrated in FIG. 7. Here, a horizontal axis indicates density of pre-output image data D_in and a vertical axis indicates density of post-output image data D_out. Here, in a case where periodic density unevenness is generated, the input/output gradation characteristics vary among phases. A case where density unevenness of being output in a manner darker as a whole than a certain region in a phase B is generated in a certain region in a phase A is considered as an example. In that case, as illustrated in FIG. 7, output of a curved line of an input/output gradation characteristic in the phase A is larger than that of a curved line of an input/output gradation characteristic in the phase B even when input is the same. Note that characteristics indicated here are examples and may vary depending on a configuration of a device.

Note that the above input/output gradation characteristics Fio_A and Fio_B is preferably calculated not from one piece of pre-output image data and post-output image data but from a plurality of pieces of pre-output image data and post-output image data in terms of elimination of an error. However, since an image forming characteristic of the image forming unit 150 varies and an input/output gradation characteristic also varies as time passes, an input/output gradation characteristic is preferably acquired from a plurality of pieces of pre-output image data and post-output image data while the latest pre-output image data and post-output image data are weighted heavily and old pre-output image data and post-output image data are weighted lightly.

Also, with the control by the control unit 101, the input/output gradation characteristic calculating unit 121 calculates a reference gradation characteristic Fio_ref as an input/output gradation characteristic to be a reference in correction and this reference gradation characteristic Fio_ref is held by the reference gradation characteristic holding unit 122 (step S208 in FIG. 6).

Note that the reference gradation characteristic Fio_ref generated by the input/output gradation characteristic calculating unit 121 is calculated by averaging of input/output gradation characteristics Fio_A and Fio_B in a plurality of regions in a case where pre-output image data and post-output image data necessary for calculation of the input/output gradation characteristic are acquired adequately.

Figure 8:
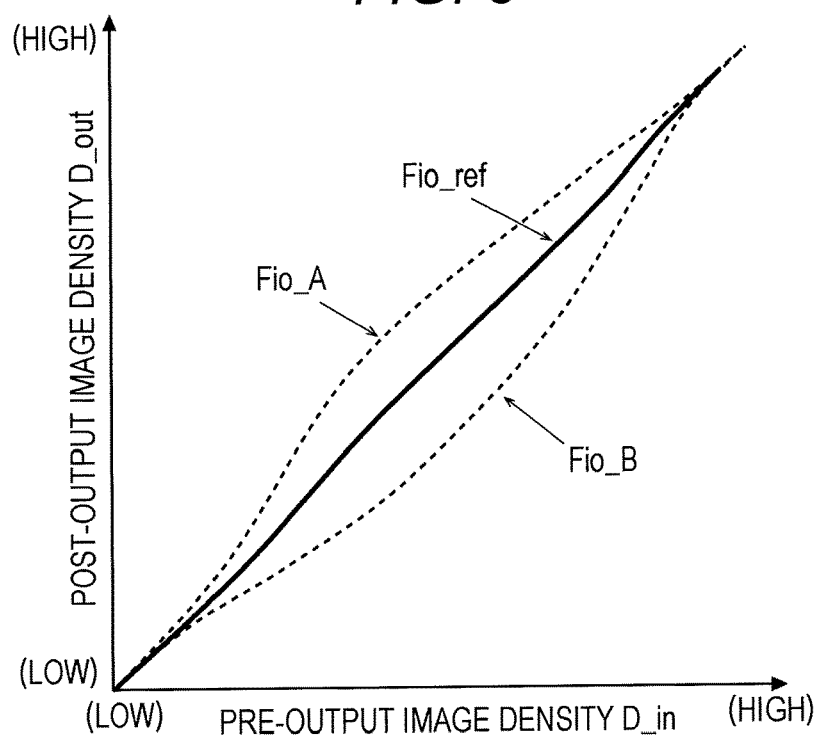
FIG. 8 is a characteristic view illustrating a characteristic of image processing in the embodiment of the present invention.

For example, as illustrated in FIG. 8, a reference gradation characteristic Fio_ref (solid line) is calculated by averaging of input/output gradation characteristics Fio_A and Fio_B (broken line). In such a manner, it becomes possible to correct density unevenness in each of a plurality of regions with a small correction amount according to each device by averaging the input/output gradation characteristics Fio_A and Fio_B and calculating the reference gradation characteristic Fio_ref.

Note that it is preferable that the reference gradation characteristic Fio_ref is acquired not from one piece of pre-output image data and post-output image data but from a plurality of pieces of pre-output image data and post-output image data in terms of elimination of an error. However, since an image forming characteristic of the image forming unit 150 varies as time passes, acquisition from a plurality of pre-output image data and post-output image data is performed with the latest one being weighted heavily and old one being weighted lightly.

Moreover, in a case where pre-output image data and post-output image data necessary for calculation of an input/output gradation characteristic are not acquired adequately or a case where a fixed reference gradation characteristic is demanded, a previously-given input/output gradation characteristic may be used for generation of the reference gradation characteristic Fio_ref by the input/output gradation characteristic calculating unit 121. In this case, an input/output gradation characteristic given by a user may be used or a predetermined input/output gradation characteristic may be held as a reference gradation characteristic in the reference gradation characteristic holding unit 122 in production of the image forming device 100. Note that by designation by a user, a fixed reference gradation characteristic may be replaced with the above-described average of input/output gradation characteristics in a plurality of regions.

Then, by control by the control unit 101, the correction data calculating unit 123 calculates correction data to solve a difference between the reference gradation characteristic Fio_ref and the input/output gradation characteristics Fio_A and Fio_B in the plurality of regions (step S209 in FIG. 6).

Figure 9:
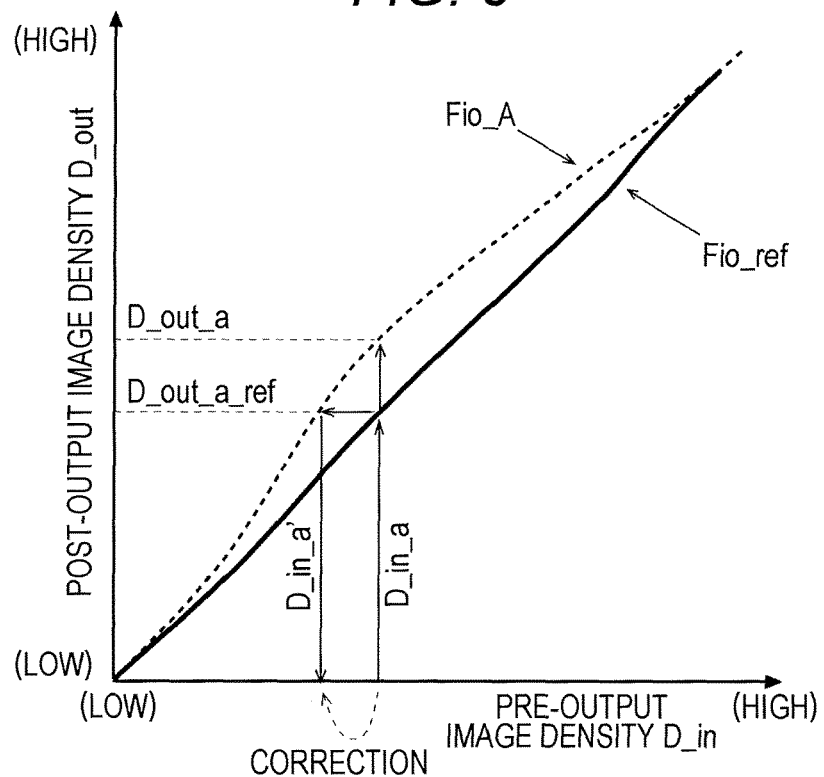
FIG. 9 is a characteristic view illustrating a characteristic of image processing in the embodiment of the present invention.

Here, with reference to FIG. 9, a procedure of calculating correction data to solve a difference between the input/output gradation characteristic Fio_A acquired in the phase A and the reference gradation characteristic Fio_ref will be described in the following.

(1) In the input/output gradation characteristic Fio_A acquired in the phase A, post-output image density D_out_a is acquired in response to pre-output image density D_in_a.
(2) In a case where the reference gradation characteristic Fio_ref is applied instead of the input/output gradation characteristic Fio_A acquired in the phase A, post-output image density D_out_a_ref is acquired in response to the pre-output image density D_in_a. That is, when density corresponding to the post-output image density D_out_a_ref is acquired in response to the pre-output image density D_in_a, input/output gradation characteristics are identical in a plurality of regions and density unevenness is solved.
(3) Thus, pre-output image density D_in_a' with which the post-output image density D_out_a_ref is acquired in the input/output gradation characteristic Fio_A is back calculated.
(4) In the phase A, the ideal post-output image density D_out_a_ref is also acquired when the input/output gradation characteristic Fio_A is applied after the pre-output image density D_in_a is corrected into the pre-output image density D_in_a'.
(5) Correction data to correct the pre-output image density D_in_a into the pre-output image density D_in_a' is calculated in the pre-output image density D_in_a in the phase A.
(6) Similarly, in pre-output image density D_in_0 to D_in_max in the phase A, correction data to convert the pre-output image density D_in_0 to D_in_max into pre-output image density D_in_0' to D_in_max' is calculated in such a manner that post-output image density D_out_0_ref to D_out_max_ref is acquired in a case where the input/output gradation characteristic Fio_A is applied.

Then, the correction data calculating unit 123 calculates correction data with respect to the phase B similarly to the phase A. Moreover, it is considered that density unevenness varies in a shape of a sine wave in a sub scanning direction other than the phase A and the phase B as illustrated in FIG. 5. Thus, by the control by the control unit 101, the correction data calculating unit 123 calculates correction data in all phases in one period of a rotary part by interpolation with reference to correction data of the phase A and the phase B (step S209 in FIG. 6).

Note that the correction data calculating unit 123 supplies the image processing unit 140 with correction data for periodic density unevenness in the sub scanning direction, which data is calculated in the above manner, in a format of a look-up table or the like.

Then, the control unit 101 controls each part in the image forming device 100 in such a manner that paper on which image forming is already performed is ejected to a predetermined paper ejecting unit (step S107 in FIG. 6). Then, by using the correction data, the image processing unit 140 executes image processing of before image forming (step S103 in FIG. 6).

Note that as density unevenness correction processing by the image forming device 100, the control unit 101 controls each part in such a manner that a series of processing similar to the above is executed repeatedly until the processing is over with respect to whole instructed document image data (NO in step S210→step S202 in FIG. 6, or YES in step S210→end in FIG. 6).

By such image processing, an image acquired by image forming in the image forming unit 150 is in a state in which an input/output gradation characteristic is equivalent to a reference gradation characteristic in each of a plurality of regions in the sub scanning direction. That is, image forming is executed in a state in which periodic density unevenness in the sub scanning direction is solved.

Also, the above density unevenness correction processing (step S201 to step S210 in FIG. 6) is automatically executed along with the image forming (step S101 to step S108 in FIG. 1). Thus, it is not necessary to print a special test chart. Thus, it becomes possible to avoid a situation in which normal image forming is limited due to printing of a test chart and productivity is decreased. Also, since a constant density region in an image is not necessary, execution in a normal state is possible. Moreover, even in a case where a schedule of normal image forming is tight, it is possible to execute correction of density unevenness at arbitrary timing or regularly since a test chart is not necessary.

Second Embodiment

When post-output image data is not accumulated adequately, there is a case where data in one of a phase A and a phase B is not acquired adequately. Thus, it is not possible to average input/output gradation characteristics Fio_A and Fio_B (broken line) and to calculate a reference gradation characteristic Fio_ref (solid line) in a manner illustrated in FIG. 8. In such a case, it is preferable to use a reference gradation characteristic Fio_ref that is previously held in the reference gradation characteristic holding unit 122.

Third Embodiment

Figure 10:
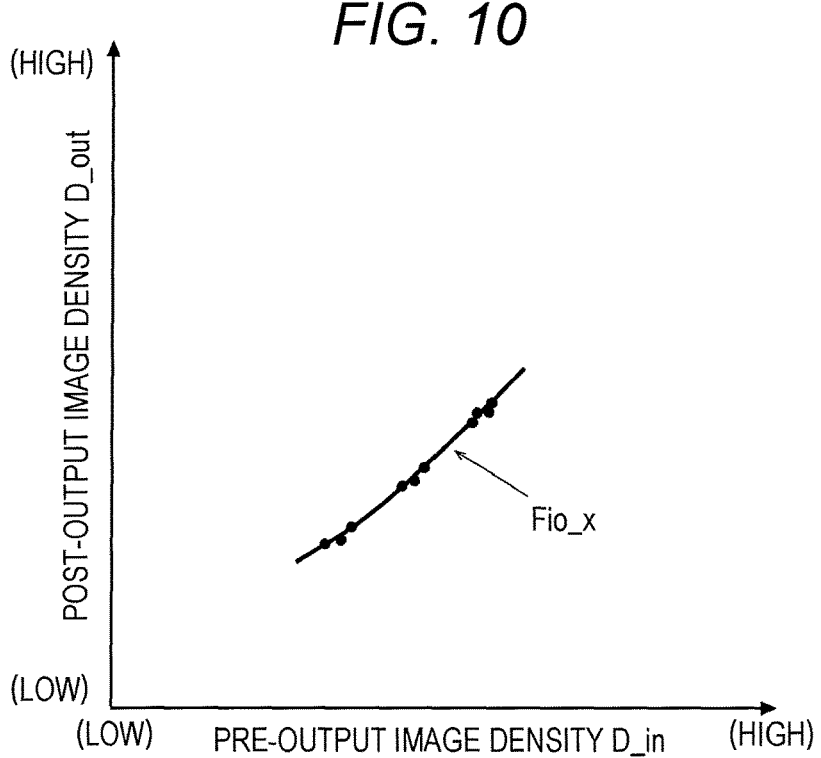
FIG. 10 is a characteristic view illustrating a characteristic of image processing in the embodiment of the present invention.

FIG. 10 is a view illustrating a state in which an input/output gradation characteristic Fio_x in a certain phase is acquired only in a part of a density region. In this case, it is difficult to calculate a reference gradation characteristic Fio_ref by averaging of input/output gradation characteristics of a plurality of regions. In such a case, it is preferable to use a reference gradation characteristic Fio_ref that is previously held in the reference gradation characteristic holding unit 122.

Figure 11:
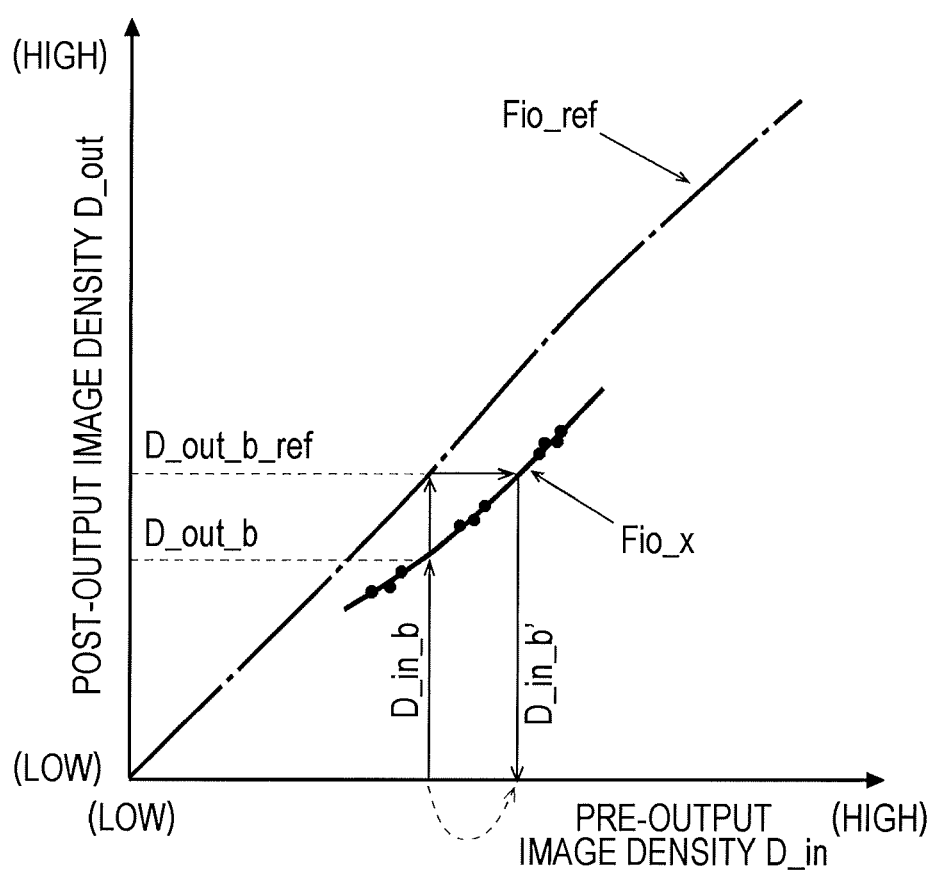
FIG. 11 is a characteristic view illustrating a characteristic of image processing in the embodiment of the present invention.

That is, as illustrated in FIG. 11, in an input/output gradation characteristic Fio_x, pre-output image density D_in_b' with which post-output image density D_out_b_ref is acquired by application of a reference gradation characteristic Fio_ref in response to pre-output image density D_in_b is back calculated and correction data to correct the pre-output image density D_in_b into the pre-output image density D_in_b' is calculated. Similarly, correction data is calculated in a range in which an input/output gradation characteristic Fio_x exists.

Note that in a case where pre-output image data and post-output image data are acquired only in a part of gradation, only a range of the part of the gradation is gradation necessary for correction. Thus, a problem is not generated. Also, in a case where pre-output image data and post-output image data are accumulated adequately, a reference gradation characteristic is calculated and correction data is calculated by the above-described processing.

Fourth Embodiment

It is expected that periodic density unevenness in a sub scanning direction changes over time. Thus, when accumulated post-output image data is used as data for detecting periodic density unevenness, too old data may be different from a tendency of currently-generated periodic density unevenness. When such data is used, it is not possible to accurately detect and correct the currently-generated periodic density unevenness. In consideration of such a change over time, time information is associated to post-output image data. Weighting is performed according to the time information and the post-output image data is reflected in unevenness detection data according to the weighting.

For example, it is assumed that there are data A by 30 days ago, data B by 15 days ago, and data C of 0 days ago (at present). It is considered that A is weighted with 0, B is weighted with 0.5, and C is weighted with 1. In this case, the data A is not used at all since being old, the data B is reflected with a half of weight, and the data C is reflected as it is since being new. Accordingly, correction corresponding to a current condition of a device becomes possible.

Fifth Embodiment

Even in a case of a system to print a color image by using a plurality of kinds of color materials, the same method can be basically used. However, it is expected that periodic density unevenness that is a target of correction in the above technology is generated due to a cause, which is unique for a color material, such as a photoreceptor or a developing sleeve. For example, even when periodic density unevenness is generated due to eccentricity of a photoreceptor for cyan, the unevenness is not generated in a different color. Thus, in detection of periodic density unevenness, it is necessary to detect periodic density unevenness for each color material. Thus, when an input/output gradation characteristic is created from document image data and print result image data at the position, only a pure color component of each color material is extracted. For example, in detection of unevenness in cyan, in a case where there are two pieces of data of (C, M, Y, K)=(50, 0, 0, 0) and (50, 0, 50, 0), the former data (C, M, Y, K)=(50, 0, 0, 0) only having a cyan pure color component is selected and the data of (C, M, Y, K)=(50, 0, 50, 0) is not selected. Accordingly, it becomes possible to appropriately correct periodic density unevenness generated due to a cause unique for the color material.

Sixth Embodiment

Figure 12A:
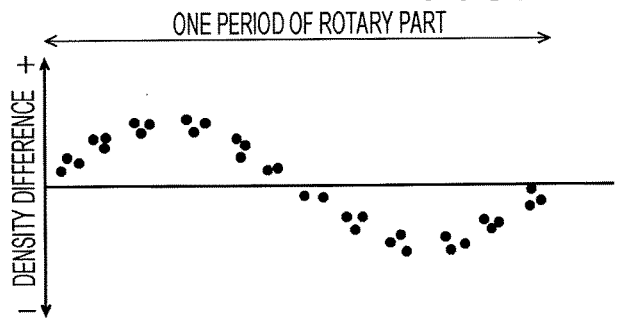
FIGS. 12A to 12D are characteristic views illustrating characteristics of image processing in the embodiment of the present invention.
Figure 12B:
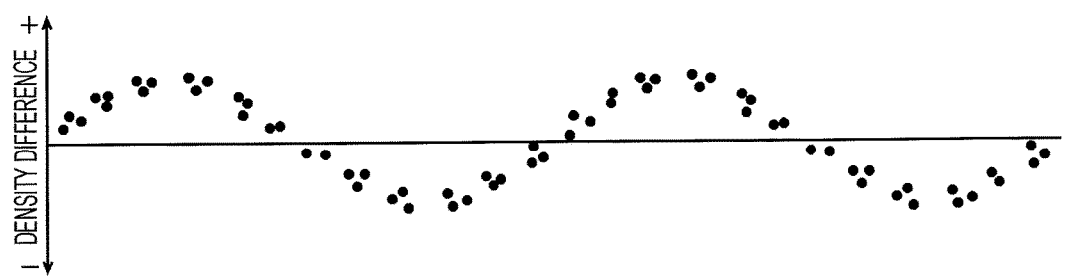

In consideration of a cause being eccentricity of a rotary part, it is considered that periodic density unevenness to be corrected is generated in such a manner that a contrast of density unevenness varies periodically in a sine wave shape in a sub scanning direction. On the other hand, a noise such as linear unevenness which noise is other than that in a period to be corrected may be included in accumulated data. Thus, even when a shape of periodic density unevenness is a smooth sine wave, data in the shape is not always acquired. In that case, correction accuracy is increased when data with the noise is approximated to a sine wave in the sub scanning direction and a correction value is created from the approximated data. FIG. 12A is a view illustrating one period of a data group accumulated in certain gradation. In FIG. 12B, the data in FIG. 12A is copied as data in a plurality of periods.

Figure 12C:
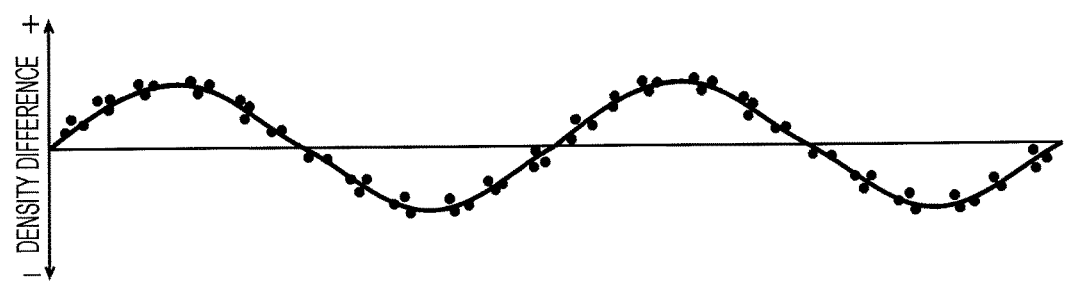
Figure 12D:
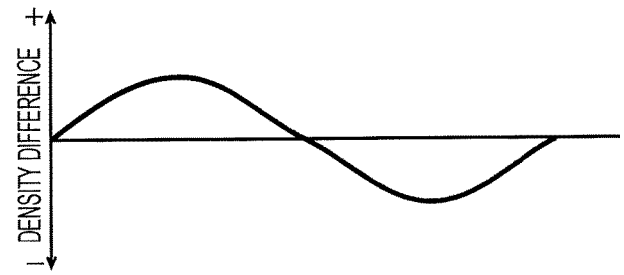

Then, as illustrated in FIG. 12C, it is possible to extract a sine wave component by performing frequency analysis as data repeated periodically. FIG. 12D is a view illustrating a state in which one period of the sine wave extracted by the frequency analysis is extracted. By using a shape of the sine wave acquired in such a manner, the correction data calculating unit 123 calculates correction data in all phases in one period of a rotary part by interpolation with reference to correction data in a phase A and a phase B.

Seventh Embodiment

There is a plurality of rotary parts to be causes of generation of periodic density unevenness and the causes are independent from each other. Thus, density unevenness in a plurality of different periods may be generated simultaneously. It is necessary to acquire an input/output gradation characteristic in a phase in each of a plurality of periods and to calculate and correct each kind of density unevenness appropriately by acquiring an input/output gradation characteristic in a phase in each of the plurality of periods with a focus on the plurality of different periods in different rotary members.

In that case, in accumulation of data of density unevenness in a certain period, an influence of density unevenness in a different period is included as a noise. Thus, in detection of density unevenness in a specific period, it is preferable that density unevenness in a different period is already corrected and is not generated.

In correction of density unevenness in two different periods, data in more periods can be acquired in density unevenness in a short period than in density unevenness in a long period in a case of the same printing amount. Thus, it is possible to accumulate data more quickly and to create an accurate correction value more quickly. Thus, it is possible to more quickly create a correction value with less influence of a noise by creating a correction value for density unevenness in a short period first and subsequently detecting density unevenness in a long period with application of the correction value. Thus, it is possible to acquire an input/output gradation characteristic in each of a plurality of periods appropriately without an influence of a noise and it becomes possible to correct each kind of density unevenness accurately.

Eighth Embodiment

As a method to reduce an influence of density unevenness in a different period, there is a method to associate phase information in a different period to data and to reflect the data with weighting in such a manner that a bias is not generated in a phase when a correction value of density unevenness in a certain period is created.

Figure 13A:
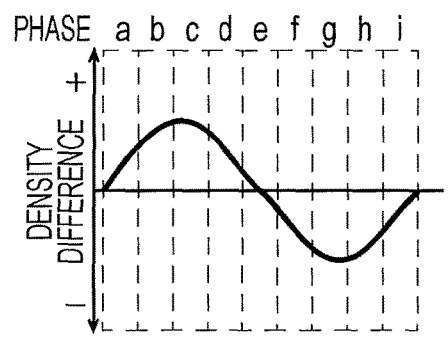
FIGS. 13A to 13C are characteristic views illustrating characteristics of image processing in the embodiment of the present invention.
Figure 13B:
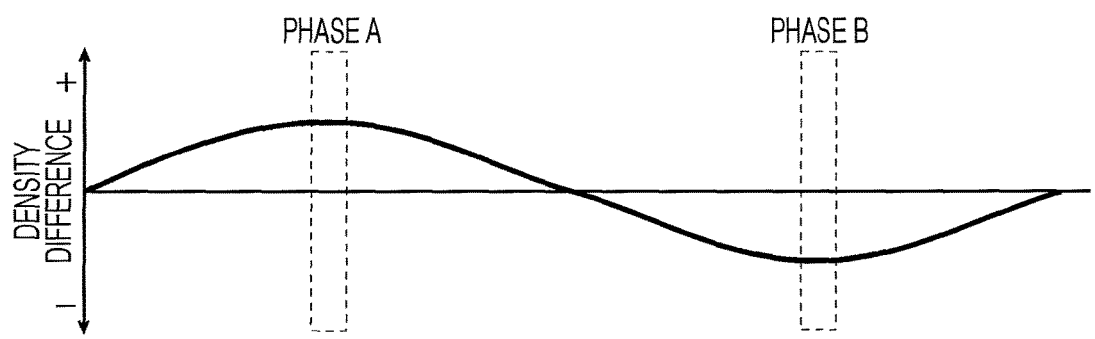
Figure 13C:
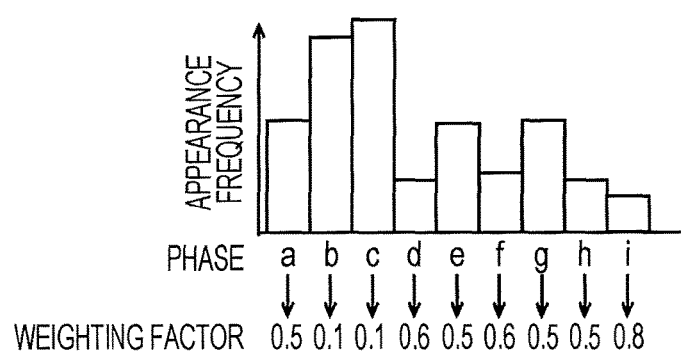

The method is illustrated in FIGS. 13A to 13C. For example, it is assumed that first periodic density unevenness (FIG. 13A) and second periodic density unevenness (FIG. 13B) are generated. Here, a case of creating correction data of second periodic density unevenness is assumed. When data in a specific phase A in the second periodic density unevenness is focused on, for example, in a case where many dark parts (phase b and phase c) of the first periodic density unevenness are included in the data of the phase A, the data of the phase A tends to be dark due to an influence of the phases b and c.

However, since not being an original tendency of the second periodic density unevenness, this acts as a noise in detection of the second periodic density unevenness. In order to reduce an influence of the noise, in a case where many pieces of data in a specific phase in a first period are in the data of the phase A, the pieces of data are multiplied by a factor and weight thereof is changed.

For example, as illustrated in FIG. 13C, each of weighting factors corresponding to the phases b and c is determined by an inverse number of an appearance frequency. It is preferable that a correction value of the second periodic density unevenness is calculated with weighting in such a manner that an influence of data of all phases in the first period is averaged.

Ninth Embodiment

Figure 14:
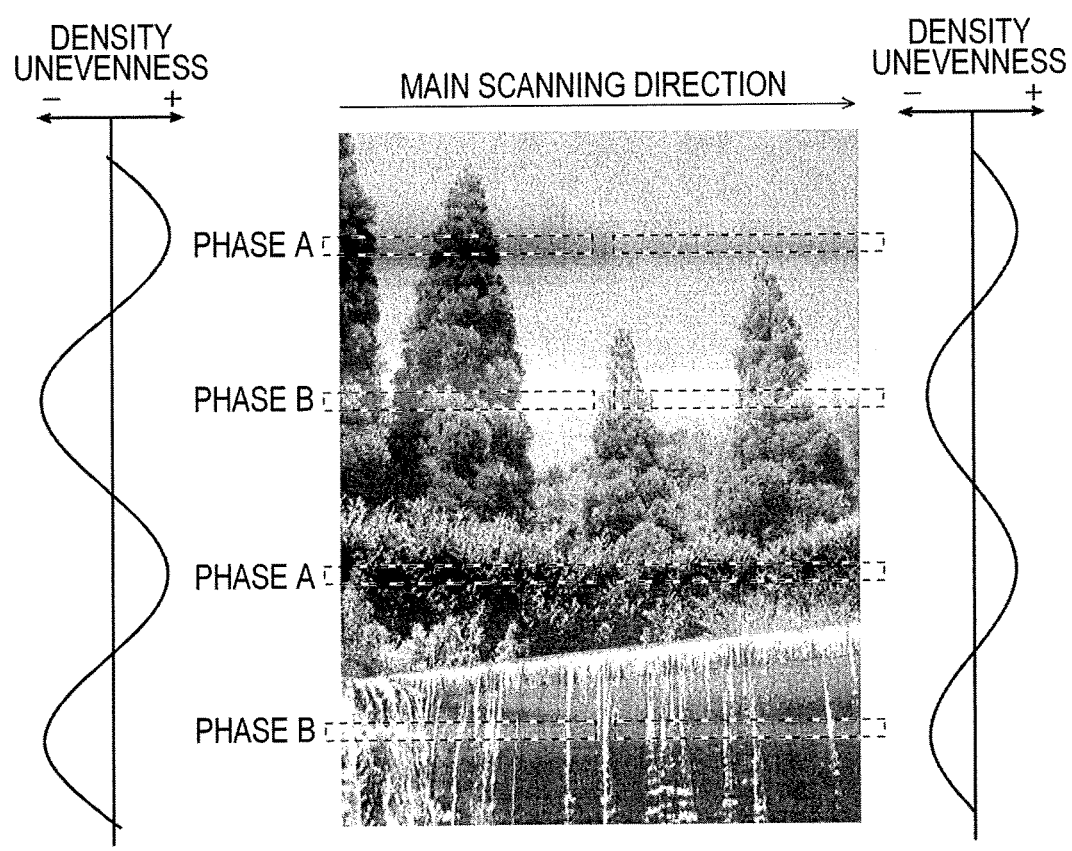
FIG. 14 is a characteristic view illustrating a characteristic of image processing in the embodiment of the present invention.

There is a case where amplitude of periodic density unevenness generated in a sub scanning direction varies depending on a main scanning position. In that case, data may be divided and collected at each main scanning position and correction data at each main scanning position may be created. This is illustrated in FIG. 14. For example, it is assumed that amplitude of periodic density unevenness on a left side of an image in FIG. 14 tends to be larger than amplitude of periodic density unevenness on a right side of the image in FIG. 14. In that case, data is collected separately on the left side and the right side of the image in the main scanning direction illustrated in FIG. 14, different correction values are created, and correction values are changed and applied according to a main scanning position, whereby a more accurate correction effect can be acquired.

Note that the main scanning direction is divided into two in FIG. 14. However, this is not the limitation and measurement of density unevenness and calculation of correction data may be performed with the direction being divided into three or more.

Tenth Embodiment

In a case where data is accumulated after a correction value is applied to an image, document image data is actually changed by correction and is output. Thus, it is necessary to accumulate data in consideration of that.

A case where input document image data is 128 and image forming is executed after 128 is corrected into 100 for correction of density unevenness is assumed. In this case, 100 instead of 128 is accumulated as pre-output image data.

In this case, even when 128 is input as document image data, 100 is supplied as pre-output image data to the image forming unit 150. With an influence of density unevenness remaining at the time point, post-output image data is acquired.

That is, when an input/output gradation characteristic is calculated from pre-output image data corrected by the image processing unit 140 with correction data, it becomes possible to appropriately calculate and correct density unevenness without an influence of already-executed correction.

Another Embodiment

In a case where the density unevenness detecting unit 120 has enough calculation capability, data not only in the above-described two phase regions in one period but also in more detailed regions may be measured. Accordingly, it becomes possible to appropriately calculate and correct density unevenness in detail.

Also, the control unit 101 can determine that some kind of trouble is generated in the image forming unit 150 in a case where correction data in each region which data is calculated in the above manner exceeds a previously-assumed range. In this case, it is also preferable that various kinds of reactions such as suspending image forming and notifying a call center are given.

According to an embodiment of the present invention, in the image processing device, the image forming device, the image forming system, and the image processing program on which an aspect of the present invention is reflected, the following effects can be acquired.

(1) When linear image forming in a first direction is repeatedly executed in a second direction orthogonal to the first direction and two-dimensional image forming is executed on a recording medium, a phase of a member that contributes to image forming by rotating or circulating in the second direction is acquired, an input/output gradation characteristic calculating unit calculates, for each of a plurality of different phases, an input/output gradation characteristic indicating a correspondence relationship in density in the same pixels in pre-output image data used for image forming in the image forming device and post-output image data acquired by scanning of an image formed on a recording medium by the image forming device, correction data to solve a difference between the input/output gradation characteristic in each of the phases and a reference input/output gradation characteristic is calculated for each of the phases, and an image processing unit corrects the pre-output image data with the correction data of each of the phases and performs image processing in such a manner that the difference in the input/output gradation characteristic is solved in each phase. Thus, it becomes possible to detect and correct density unevenness, which is generated in image forming, without printing of a special test chart and without existence of a constant density region in an image. Thus, it becomes possible to avoid a situation in which normal image forming is limited due to printing of a test chart and productivity is decreased. Also, a problem of consumption of paper, toner, and the like is solved. Moreover, since a test chart is not necessary, it is possible to execute correction of density unevenness at arbitrary timing even in a case where a schedule of normal image forming is tight.

(2) In (1) described above, when an input/output gradation characteristic is calculated after the pre-output image data and the post-output image data are accumulated and stored for each phase, it becomes possible to detect and correct density unevenness accurately in a state in which an influence of an error is less likely to be received.

(3) In (2) described above, in a case where an input/output gradation characteristic is calculated after the pre-output image data and the post-output image data are accumulated and stored for each phase, when a weighting factor is changed according to time of accumulation and storage and a large weighting factor is set for time close to a time point of the calculation, it becomes possible to detect and correct density unevenness accurately in a state on which a condition of a current time point is reflected.

(4) In (1) to (3) described above, when one of an input/output gradation characteristic, which is calculated by averaging of input/output gradation characteristics in a plurality of different phases, and a previously-given input/output gradation characteristic is used as a reference input/output gradation characteristic, it becomes possible to detect and correct density unevenness accurately in a stable state.

(5) In (1) to (3) described above, it becomes possible to detect and correct density unevenness accurately in a stable state when a reference input/output gradation characteristic is calculated by averaging of input/output gradation characteristics in a plurality of different phases in a case where a necessary amount of pre-output image data and post-output image data necessary for calculation of the input/output gradation characteristics is acquired, and when a previously-given input/output gradation characteristic is used as the reference input/output gradation characteristic in a case where the necessary amount of the pre-output image data and the post-output image data is not acquired. Also, since a previously-prepared reference characteristic can be used at a time point, at which there is a small amount of data, and a reference characteristic corresponding to an actual condition can be used at a time point at which there is a large amount of data, it becomes possible to detect and correct density unevenness accurately in a stable state.

(6) In (1) to (5) described above, in a case where pre-output image data and post-output image data are acquired only in apart of a region or apart of gradation, an input/output gradation characteristic is calculated only in the part of the region or the part of the gradation and correction data is calculated in the part of the region or the part of the gradation where the input/output gradation characteristic exists. In such a manner, even in a case where there is a little input of pre-output image data and post-output image data and it is not possible to generate a complete input/output gradation characteristic, it becomes possible to correct density unevenness in each of a plurality of regions. Note that in a case where pre-output image data and post-output image data are acquired only in a part of a region or apart of gradation, only the part of the region or the part of the gradation is a region or gradation necessary for correction. Thus, a problem is not generated.

(7) In (1) to (6) described above, in a case where the image forming device forms a color image on a recording medium by using color materials in a plurality of colors, when an input/output gradation characteristic is calculated in a pixel in which only a color material in any one color is used, it becomes possible to accurately calculate and correct an input/output gradation characteristic due to density unevenness in a target color without an influence of a color material in a different color.

(8) In (1) to (7) described above, when a sine wave approximated with reference to a calculation result of each phase is calculated and correction data is calculated by utilization of the sine wave, it becomes possible to perform appropriate correction in a whole period with calculation results of some phases in one period.

(9) In (1) to (8) described above, when an input/output gradation characteristic is acquired, with a focus on a plurality of different periods in members different with respect to rotations or circulations in the members, in a phase in each of the plurality of periods, it becomes possible to acquire the input/output gradation characteristic in each phase in the plurality of periods and to appropriately calculate and correct each kind of density unevenness.

(10) In (9) described above, in a case where an input/output gradation characteristic is acquired in a phase in each of the plurality of periods, when an input/output gradation characteristic in a phase in a short period is acquired first and an input/output gradation characteristic in a phase in a long period is acquired successively, it becomes possible to appropriately acquire an input/output gradation characteristic in each of the plurality of periods without an influence of a noise and to accurately correct each kind of the density unevenness.

(11) In (9) and (10) described above, in acquisition of an input/output gradation characteristic in a phase in each of the plurality of periods, in a case where a phase in which an input/output gradation characteristic is to be acquired is a focused phase and a phase other than the focused phase is a not-focused phase, it becomes possible to acquire the input/output gradation characteristic appropriately in a phase in each of the plurality of periods without a bias due to an influence of a phase in a different period and to accurately correct each kind of the density unevenness when an influence of the not-focused phase on the focused phase is reduced by weighting performed in the focused phase, in such a manner that a frequency of a component of the not-focused phase is equalized, and an input/output gradation characteristic in the focused phase is acquired.

(12) In (1) to (11) described above, when calculation of an input/output gradation characteristic in a second direction executed by an input/output gradation characteristic calculating unit, calculation of correction data in the second direction executed by a correction data calculating unit, and correction of image data executed by an image processing unit with correction data are executed at each of a plurality of positions in a first direction, it becomes possible to appropriately calculate and correct density unevenness according to a difference in existence/non-existence of density unevenness in the first direction, according to required accuracy in density unevenness, and according to an allowable calculation amount.

(13) In (1) to (12) described above, when an input/output gradation characteristic is calculated from pre-output image data corrected with correction data by the image processing unit, it becomes possible to appropriately calculate and correct density unevenness without an influence of already-executed correction.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing device used for image processing in an image forming device that executes linear image forming in a first direction repeatedly in a second direction orthogonal to the first direction and executes two-dimensional image forming on a recording medium,
the image forming device using pre-output image data which includes a plurality of first pixels,
the image forming device acquiring post-output image data by scanning an image formed on the recording medium, the post-output image data including a plurality of second pixels corresponding to the first pixels, and
the image processing device comprising:
a processor configured to:
acquire a plurality of different phases of a member that contributes to image forming by rotating or circulating in the second direction;
calculate, for each of the plurality of different phases, an input/output gradation characteristic indicating a correspondence relationship in density in corresponding pixels of the plurality of first pixels in the pre-output image data and of the plurality of second pixels of the post-output image data;
calculate, for each of the plurality of different phases, correction data to solve a difference between the input/output gradation characteristic in each of the plurality of different phases and a reference input/output gradation characteristic; and
correct the pre-output image data with the correction data of each of the plurality of different phases.

2. The image processing device according to claim 1, wherein
when calculating the input/output gradation characteristic,
the processor calculates the input/output gradation characteristic after accumulating and storing the pre-output image data and the post-output image data for each of the plurality of different phases.

3. The image processing device according to claim 2, wherein
when calculating the input/output gradation characteristic after accumulating and storing the pro-output image data and the post-output image data for each of the plurality of different phases,
the processor changes a weighting factor according to a point in time of the accumulating and the storing, and sets a larger weighting factor when the point in time of the accumulating and the storing is closer to a point in time of the calculating.

4. The image processing device according to claim 1, wherein
the processor uses, as the reference input/output gradation characteristic, one of an input/output gradation characteristic, which is calculated by averaging of the input/output gradation characteristics in the plurality of different phases, and a previously-given input/output gradation characteristic.

5. The image processing device according to claim 1, wherein
the processor calculates the reference input/output gradation characteristic by averaging of the input/output gradation characteristics in the plurality of different phases in a case where a necessary amount of the pre-output image data and the post-output image data necessary for calculation of the input/output gradation characteristics is acquired, and
uses a previously-given input/output gradation characteristic as the reference input/output gradation characteristic in a case where the necessary amount of the pre-output image data and the post-output image data is not acquired.

6. The image processing device according to claim 1, wherein
in a case where the pre-output image data and the post-output image data are acquired only in a part of a region or a part of gradation, the processor calculates the input/output gradation characteristic only in the part of the region or the part of the gradation, and calculates the correction data in the part of the region or the part of the gradation in which the input/output gradation characteristic exists.

7. The image processing device according to claim 1, wherein in a case where the image forming device forms a color image on the recording medium by using color materials in a plurality of colors, the processor calculates the input/output gradation characteristic in corresponding pixels in which only a color material in any one color is used.

8. The image processing device according to claim 1, wherein the processor calculates a sine wave approximated with reference to a result of calculation in each of the plurality of different phases and calculates the corrections data by using the sine wave.

9. The image processing device according to claim 1, wherein the processor acquires, with a focus on a plurality of different periods in different members with respect to a rotation or circulation in the member, an input/output gradation characteristic in a phase in each of the plurality of periods.

10. The image processing device according to claim 9, wherein when acquiring the input/output gradation characteristic in the phase of each of the plurality of periods, the processor first acquires an input/output gradation characteristic in a phase of a short period and subsequently acquires an input/output gradation characteristic in a phase of a long period.

11. The image processing device according to claim 9, wherein when acquiring the input/output gradation characteristic in the phase of each of the plurality of periods, in a case where a phase in which the input/output gradation characteristic is to be acquired is a focused phase and a phase other than the focused phase is a not-focused phase, the processor reduces an influence of the not-focused phase on the focused phase by performing weighting in the focused phase in such a manner that a frequency of a component of the not-focused phase is equalized, and acquires the input/output gradation characteristic in the focused phase.

12. The image processing device according to claim 1, wherein calculation of an input/output gradation characteristic in the second direction, calculation of correction data in the second direction, and correction of the image data with the correction data which are executed by the processor are executed at each of a plurality of positions in the first direction.

13. The image processing device according to claim 1, wherein the processor calculates the input/output gradation characteristic from the pre-output image data corrected with the correction data by the image processing unit.

14. An image forming device that executes linear image forming in a first direction repeatedly in a second direction orthogonal to the first direction and executes two-dimensional image forming on a recording medium, the device comprising:

the image processing device according to claim 1, an image forming unit that performs image forming on the basis of pre-output image data image processing of which is performed by the image processing device;

an image reading unit that reads an image, image forming of which is performed by the image forming unit, and generates post-output image data; and a phase acquiring unit that acquires the plurality of different phases of the member that contributes to image forming by rotating or circulating in the second direction in the image forming unit.

15. An image forming system that executes linear image forming in a first direction repeatedly in a second direction orthogonal to the first direction and executes two-dimensional image forming on a recording medium, the system comprising:

the image processing device according to claim 1;

an image forming device that performs image forming on the basis of pre-output image data image processing of which is performed by the image processing device;

an image reading device that reads an image, image forming of which is performed by the image forming device, and generates post-output image data; and a phase acquiring unit that acquires the plurality of different phases of the member that contributes to image forming by rotating or circulating in the second direction in the image forming device.

16. A non-transitory recording medium storing a computer readable program for controlling an image processing device used for image processing in an image forming device that executes linear image forming in a first direction repeatedly in a second direction orthogonal to the first direction and executes two-dimensional image forming on a recording medium, the image forming device using pre-output image data which includes a plurality of first pixels, the image forming device acquiring post-output image data by scanning an image formed on the recording medium, the post-output image data including a plurality of second pixels corresponding to the first pixels, and the program causing a computer to:

acquire a plurality of different phases of a member that contributes to image forming by rotating or circulating in the second direction;

calculate, for each of the plurality of different phases, an input/output gradation characteristic indicating a correspondence relationship in density in corresponding pixels of the plurality of first pixels in the pre-output image data and of the plurality of second pixels of the post-output image data;

calculate, for each of the plurality of different phases, correction data to solve a difference between the input/output gradation characteristic in each of the plurality of different phases and a reference input/output gradation characteristic; and correct the pre-output image data with the correction data of each of the plurality of different phases.

* * * * *